(12) United States Patent
Wang

(10) Patent No.: US 8,960,040 B2
(45) Date of Patent: Feb. 24, 2015

(54) ELECTRONIC SHIFTER WITH ADAPTIVE POSITION

(75) Inventor: Orson S. Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 448 days.

(21) Appl. No.: 13/232,158

(22) Filed: Sep. 14, 2011

(65) Prior Publication Data

US 2013/0061706 A1  Mar. 14, 2013

(51) Int. Cl.
*B60K 20/00* (2006.01)
*F16H 61/24* (2006.01)
*F16H 59/10* (2006.01)
*F16H 59/02* (2006.01)
*F16H 63/42* (2006.01)

(52) U.S. Cl.
CPC .............. *F16H 61/24* (2013.01); *F16H 59/105* (2013.01); *F16H 59/10* (2013.01); *F16H 2059/0295* (2013.01); *F16H 2061/245* (2013.01); *F16H 2063/423* (2013.01)
USPC .................. 74/473.25; 74/473.26; 74/473.12; 74/473.19; 74/473.22; 74/473.3

(58) Field of Classification Search
USPC ........... 74/473.1, 0.19, 0.21, 0.22, 0.24, 0.25, 74/0.26, 0.3, 0.12; 200/61.88
See application file for complete search history.

(56) References Cited

U.S. PATENT DOCUMENTS

| | | |
|---|---|---|
| 2,723,569 A | 11/1955 | Ferguson et al. |
| 2,860,522 A | 11/1958 | Howlett |
| 2,933,945 A | 4/1960 | Brewster |
| 3,665,775 A | 5/1972 | Freeman |
| 3,863,520 A | 2/1975 | Moline et al. |
| 4,191,064 A | 3/1980 | Houk et al. |
| 4,473,141 A | 9/1984 | Mochida |
| 4,512,451 A | 4/1985 | Kobelt |
| 4,846,322 A | 7/1989 | Swank |
| 5,267,157 A * | 11/1993 | Churchill et al. ............... 701/51 |
| 5,417,126 A | 5/1995 | DeCrouppe et al. |
| 5,448,925 A | 9/1995 | McFadden |
| 5,489,246 A | 2/1996 | Moody et al. |
| 5,489,264 A * | 2/1996 | Salo ............................... 604/28 |
| 5,493,932 A | 2/1996 | Plocher |
| 5,537,885 A | 7/1996 | Thomas |

(Continued)

FOREIGN PATENT DOCUMENTS

EP          1486702 A1   12/2004
WO   WO2005039914 A2    5/2005

OTHER PUBLICATIONS

Compendium of Automotive manufacturer gear shift products on the market, dated 2002 through 2010, 13 pages.

(Continued)

*Primary Examiner* — Justin Krause
*Assistant Examiner* — Gregory Prather

(57) ABSTRACT

A latching shifter mated with a shift-by-wire transmission in which the gear cam includes a momentary shift lever position which is spring biased toward the drive gear notch. A driver is enabled to shift the transmission into a desired gear by passing the shift lever into and out of the momentary shift lever position in the event of autonomous shifting by the transmission or to otherwise provide a selected gear of the transmission. Preferably a dynamically changeable gear shift display is provided, the indicia of which is responsive to the gear status of the transmission.

10 Claims, 10 Drawing Sheets

(56) References Cited

U.S. PATENT DOCUMENTS

| | | | |
|---|---|---|---|
| 5,660,079 A | 8/1997 | Friedrich | |
| 5,675,315 A * | 10/1997 | Issa et al. | 340/456 |
| 5,682,789 A | 11/1997 | DeCrouppe et al. | |
| 5,785,626 A | 7/1998 | Osborn et al. | |
| 5,829,309 A * | 11/1998 | Wagner et al. | 74/473.22 |
| 5,861,803 A * | 1/1999 | Issa | 340/456 |
| 5,868,034 A | 2/1999 | McFadden | |
| 5,916,292 A * | 6/1999 | Issa et al. | 701/62 |
| 5,973,593 A * | 10/1999 | Botella | 340/456 |
| 6,059,689 A * | 5/2000 | Shimizu et al. | 477/98 |
| 6,199,003 B1 * | 3/2001 | Hollingsworth et al. | 701/52 |
| 6,209,408 B1 * | 4/2001 | DeJonge et al. | 74/335 |
| 6,295,887 B1 | 10/2001 | DeJonge et al. | |
| 6,332,524 B1 | 12/2001 | Shin | |
| 6,336,373 B1 | 1/2002 | Murai et al. | |
| 6,393,932 B1 | 5/2002 | Seki et al. | |
| 6,401,564 B1 * | 6/2002 | Lee | 74/473.18 |
| 6,422,106 B1 * | 7/2002 | Lee | 74/473.18 |
| 6,503,170 B1 * | 1/2003 | Tabata | 477/97 |
| 6,658,952 B2 * | 12/2003 | Hayashi et al. | 74/336 R |
| 6,684,730 B2 | 2/2004 | Giefer et al. | |
| 6,783,480 B2 | 8/2004 | Masuda et al. | |
| 6,835,162 B2 * | 12/2004 | Yamauchi et al. | 477/101 |
| 6,845,684 B2 * | 1/2005 | Inaba et al. | 74/335 |
| 6,848,332 B2 * | 2/2005 | Hayashi et al. | 74/473.33 |
| 6,918,314 B2 | 7/2005 | Wang | |
| 7,028,575 B2 * | 4/2006 | Ehrmaier et al. | 74/473.18 |
| 7,107,868 B2 * | 9/2006 | Yone | 74/335 |
| 7,393,304 B2 | 7/2008 | Wilde et al. | |
| 7,406,889 B2 * | 8/2008 | Okawa | 74/335 |
| 7,633,026 B2 * | 12/2009 | Zapf et al. | 200/61.88 |
| 7,694,602 B2 | 4/2010 | Nagano et al. | |
| 7,721,619 B2 | 5/2010 | Kamei et al. | |
| 7,723,628 B2 * | 5/2010 | Jarrett | 200/332 |
| 7,770,486 B2 * | 8/2010 | Morita et al. | 74/473.18 |
| 7,784,375 B2 | 8/2010 | Bleckmann et al. | |
| 7,900,532 B2 | 3/2011 | Abel et al. | |
| 8,004,275 B2 * | 8/2011 | Wang et al. | 324/207.24 |
| 8,138,906 B2 * | 3/2012 | Wang et al. | 340/456 |
| 8,186,241 B2 | 5/2012 | Sickart | |
| 8,485,061 B2 * | 7/2013 | Kliemannel et al. | 74/473.23 |
| 8,544,358 B1 * | 10/2013 | Giefer et al. | 74/473.25 |
| 8,577,567 B2 * | 11/2013 | Nakade et al. | 701/58 |
| 2004/0226801 A1 | 11/2004 | DeJonge et al. | |
| 2004/0237693 A1 * | 12/2004 | Koide | 74/473.18 |
| 2004/0244524 A1 | 12/2004 | Russell | |
| 2005/0223834 A1 | 10/2005 | Otsuka | |
| 2005/0223835 A1 | 10/2005 | Wang | |
| 2006/0053930 A1 * | 3/2006 | Morita et al. | 74/473.18 |
| 2006/0060019 A1 | 3/2006 | Sato et al. | |
| 2006/0216675 A1 * | 9/2006 | Ruttiger et al. | 434/71 |
| 2007/0137362 A1 | 6/2007 | Kortge et al. | |
| 2007/0234837 A1 * | 10/2007 | Russell | 74/473.12 |
| 2008/0006115 A1 | 1/2008 | Mitteer | |
| 2008/0098845 A1 | 5/2008 | Meyer | |
| 2008/0142346 A1 * | 6/2008 | Zapf et al. | 200/61.88 |
| 2009/0048066 A1 | 2/2009 | Rouleau | |
| 2009/0217782 A1 | 9/2009 | Wang | |
| 2009/0272216 A1 * | 11/2009 | Wilson et al. | 74/473.19 |
| 2009/0299585 A1 * | 12/2009 | Trush et al. | 701/52 |
| 2010/0024584 A1 | 2/2010 | Giefer et al. | |
| 2010/0071506 A1 * | 3/2010 | Kliemannel et al. | 74/625 |
| 2010/0307276 A1 | 12/2010 | Giefer et al. | |
| 2011/0132120 A1 | 6/2011 | Skogward | |
| 2011/0162475 A1 | 7/2011 | Rake et al. | |
| 2012/0285284 A1 * | 11/2012 | Wang | 74/473.3 |
| 2013/0047768 A1 * | 2/2013 | Kamoshida et al. | 74/473.3 |

OTHER PUBLICATIONS

U.S. Appl. No. 13/105,039 to Orson S. Wang, filed May 11, 2011, entiled "Latching Shifter with Override Feature".

* cited by examiner

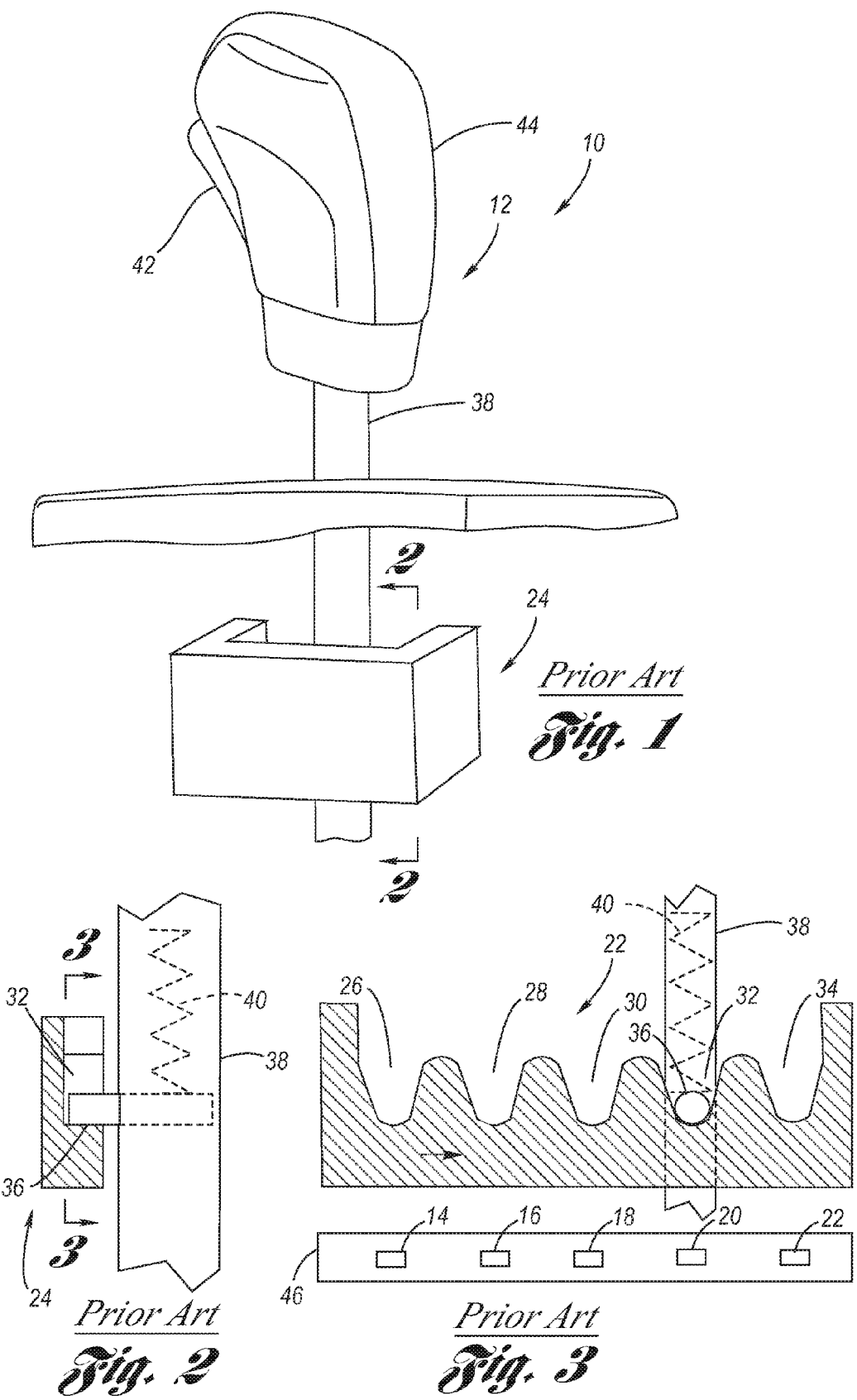

ELECTRONIC SHIFTER WITH ADAPTIVE POSITION

TECHNICAL FIELD

The present invention relates to shifting of gears of a transmission of a motor vehicle via an electronic latching shifter for a shift-by-wire transmission, and more particularly to an adaptive position of the latching shifter responsive to electronic shifting of the transmission.

BACKGROUND OF THE INVENTION

A shifter provides a driver selectable input to the transmission indicative of which gear of the transmission is desired by the driver. A shifter may be in the form of a linearly movable shift lever, a rotary knob or a push button, and may be momentary (i.e., biased to return to a "null" position after gear selection) or latching (i.e., physically latched so as to remain at the gear selected). Gear selection typically includes the following gears: gear "P" (park gear), gear "R" (reverse gear), gear "N" (neutral gear), gear "D" (drive gear), and gear "L" (low gear). Optionally, other gear selections may be available.

Shown by way of schematic example in FIGS. 1 through 3 is a latching shifter 10 having a shift lever 12 and a gear cam 24. The shift lever 12 is movable to enable driver selection of a gear from a set of various gears of a mechanical transmission 46, for example gear "P" (park gear) 14, gear "R" (reverse gear) 16, gear "N" (neutral gear) 18, gear "D" (drive gear) 20, and gear "L" (low gear) 22.

A gear cam 24 has formed therein a series of gear notches, including: a park gear notch 24 corresponding to gear "P" 14, a reverse gear notch 26 corresponding to gear "R" 28, a neutral gear notch 30 corresponding to gear "N" 18, a drive gear notch 32 corresponding to gear "D" 20, and a low gear notch 34 corresponding to gear "L" 22. A cam follower 36 is movably connected to a shaft 38 of the shift lever 12 and is biased by a spring 40 disposed within the shaft, wherein the cam follower is biasably received by the gear notch of the selected gear, as shown. A button 42 on the handle 44 of the shift lever 12 is pressed by the driver to shift out of gear "P" (park gear) in electronic association with the driver also placing his/her foot on the brake; wherein the release from/to "P" is effected either mechanically or electronically, as for example described in U.S. Pat. No. 5,489,264, issued on Feb. 6, 1996.

As shown at FIG. 3, the cam follower 36 is seatable into each gear notch, and once seated, thereupon defines the gear selected by the driver. In order to change gears, the cam follower needs to be moved against its biasing out of the gear notch it is in so that the shift lever can move to another selected gear.

In mechanical transmissions, the interface between the shifter and the gears of the transmission is mechanical, so the gear selected by the driver via movement of the shift lever is necessarily the same gear the transmission is in.

However, in shift-by-wire transmissions, the interface between the shifter and the gears of the transmission are electronic, so it is possible for the shifter to be at one gear, while, in fact, the electronics of the transmission, for various reasons related to the vehicle operation and programming, has placed the transmission in another gear than that of the shifter. In such a circumstance, the driver may erroneously infer the transmission is in his/her selected gear, as indicated by the physical position of the shift lever, yet, in fact, the electronics of the transmission has electronically shifted to another gear.

The following Table I provides typical cases of shift override by the electronics of an electronic transmission with respect to shifting from a gear that has already been selected by the driver.

TABLE I

| From Driver Selected Gear | To Auto Selected Gear P | To Auto Selected Gear R | To Auto Selected Gear N | To Auto Selected Gear D |
|---|---|---|---|---|
| P |  | Never | Never | Never |
| R | Possible |  | Possible | Never |
| N | Possible | Never |  | Never |
| D | Possible | Never | Possible |  |

The electronic interface of the shifter for a shift-by-wire transmission is accomplished in the prior art utilizing numerous techniques which provide electronic sensing of the position of the shift lever so that the electronics are aware of the gear selection by the diver, as for example utilizing a plurality hall switches or a plurality analog sensors with varying gains (as is common with respect to throttle pedal sensors).

Most prior art shift-by-wire transmission shifters are momentary in order to accommodate numerous overrides that may occur in such transmissions. For example, while driving forward at high speed, a driver's shifter selection of gear "R" may result in the electronics of the transmission selecting, instead, gear "N". Similarly in the prior art, it is known to provide a convenience feature whereby, in a situation where the vehicle is at rest and driver has shifted to gear "D", if the driver now turns off the engine, then the electronics of the transmission will automatically select gear "P" before the engine actually turns off. Momentary shifters are compatible with such overrides since the shifter is normally in a "null" or "monostable" position.

However, a problem is presented for shift-by-wire transmissions if a latching shifter is to be used, since a potential conflict may arise in a situation where the shifter's gear selection does not physically match the gear selected by the electronics of the shift-by-wire transmission. In the example above in which a driver turns the engine off while the shift lever is in the drive gear notch, and the electronics of the transmission has electronically selected gear "P" in response to the engine shut off, the problem arises that the latching shifter will remain physically in the drive gear notch. Not only would this cause confusion to the driver, but it presents a problem as to what the driver should do at the commencement of the next engine ignition cycle. The driver may want to shift from gear "P" to gear "D", but the shift lever is already in drive gear notch! The solution might be to require the driver to first move the shift lever back to the park gear notch and then to the drive gear notch, but that would negate the potential convenience that was originally intended.

Consider next the situation in which a motor vehicle spins out of control and begins travelling backward at high speed. In a mechanical transmission, this situation would result in an engine stall. But, in a shift-by-wire transmission, the electronics of the transmission would attempt to shift the transmission to gear "N" in order to avoid an engine stall. However, this autonomous electronic shifting presents a potential problem with latching shifters, since although the transmission is actually in gear "N", the shifter remains physically in the drive gear notch. In such a situation, what happens next is a question. If the driver wants to reselect gear "D", he/she is left with the confusion of the shift lever being already in the drive gear notch! One potential "solution" could be to require the driver to first move the shift lever to the neutral gear notch and then back to the drive gear notch, but this is still confusing.

In the prior art, Jaguar Cars Ltd. of Coventry, England (hereafter simply Jaguar) has addressed some of these latching shift lever concerns. The Jaguar shifter utilizes a motor to move the shifter, in the form of a knob, back to the gear "P" selection, although the motor is not designed to move the shifter to an intermediate position or to move to any other position. In fact, the motor's only capability is to address the operational scenario in which the engine is turned off while the shifter is physically in gear "D" or gear "R", but the electronics of the transmission has selected gear "P". Jaguar also has utilized a lockout mechanism, wherein in certain circumstances of operation, for example, the shifter may be permitted to move from gear "D" to gear "N", but thereupon the shifter is locked in place at gear "N". Note that the Jaguar latching shifter does not address the operational circumstance in which the electronics of the transmission has selected gear "N", yet the shifter is, in fact, physically at gear "D". In this regard, Jaguar simply indicates this untoward condition by a flashing "D" that is viewable by the driver, and meant to convey information to the driver that the transmission is actually in gear "N", not gear "D".

Accordingly, it is a significant challenge to motor vehicle engineering to mate a latching shifter with a shift-by-wire transmission, in that in such an arrangement the problem is confusion of the driver with respect to the drive gear notch position of the shift lever when the transmission has autonomously shifted to gear "P" or gear "N" for pre-programmed operational reasons.

SUMMARY OF THE INVENTION

The present invention is a latching shifter mated with a shift-by-wire transmission in which the gear cam does not have a low gear notch, instead having is a momentary shift lever position which is spring biased toward the drive gear notch, whereby, preferably in combination with a responsively changing gear select display, any driver confusion in the event of autonomous shifting by the transmission is avoided.

The electronic shifter with adaptive position according to the present invention implements electronic shifting with a linear-latching functionality with minimum cost and complexity while meeting all goals and operational situations of the motor vehicle. Analysis shows that the current, prior art shifting paradigm ("P-R-N-D-L") has asymmetric coverage of goals when electronic shifting is considered due to the fact that electronic shifting systems are empowered to autonomously shift to park gear or neutral gear in certain predetermined operational situations of the motor vehicle. In this regard, gear "R" (reverse gear) is flanked by gear "N" (neutral gear) and gear "P" (park gear), both considered safer gear states, than gear "R"; while gear "D" (drive gear) is flanked by gear "N" (neutral gear) and gear "L" (low gear), where gear "L" is considered to be not necessarily safer that gear "D". Thus, the occurrence of an autonomous gear shift by the electronics of the transmission creates a problem for the driver when the driver wishes to re-engage the gear state that the driver had desired prior to the autonomous shifting only with respect to gear "D" and not for gear "R". Accordingly, the present invention takes advantage of this asymmetry of the shifting paradigm by replacing the low gear notch with a momentary shift lever position of the gear cam, wherein the momentary shift lever position has a spring biasing toward the drive gear notch. The shifting paradigm provided by the present invention, is, therefore: "P-R-N-D-Momentary".

In a preferred structural configuration, a gear select display is disposed adjacent the shift lever and is positioned so as to have gear indicia juxtaposed each gear notch, respectively. That is, a gear indicia "P" juxtaposed the park gear notch, a gear indicia "R" juxtaposed the reverse gear notch, a gear indicia "N" juxtaposed the neutral gear notch, a gear indicia "D" juxtaposed the drive gear notch, and a preselected gear indicia juxtaposed the momentary shift lever position, which, merely by way of example, may be "L" (for Low) or "S" (for Sport), or may be some other appropriate gear indicia. Preferably, the gear indicia of the gear select display are dynamically changeable responsive to the transmission operating conditions.

There are at least five scenarios of operation of the electronic shifter with adaptive position according to the present invention.

In a first scenario of operation, the driver has placed the shift lever into the drive gear notch; however, the electronics of the transmission, in response to a pre-programmed shift execution triggered by a motor vehicle event, has placed the transmission autonomously into neutral gear irrespective of the gear shift lever placement. In this situation, the gear select display would change from the sequence: "P", "R", "N", "D", "L", where "L" is merely exemplary, as it could be "S" or another gear indicia (with the shift lever being juxtaposed "D") to "P", "R", "blank", "N", "D" (with the shift lever now being juxtaposed "N", where "blank" signifies no display of gear indicia at the gear select display. This provides visual information to the driver that the transmission has autonomously shifted to gear "N" and that in order to resume gear "D", the driver must momentarily travel the shift lever to the momentary shift lever position. Once the driver has done this, the gear select display becomes again: "P", "R", "N", "D", "L". Alternatively, the driver could manually shift any gear, such as gear "P" and then the gear select display would again become: "P", "R", "N", "D", "L".

In a second scenario of operation, the driver has the intention to place the shift lever into the drive gear notch, but instead has accidentally placed the shift lever to the momentary shift lever position. When the spring biasing places the shift lever in the drive gear notch, the transmission will be in gear "D". This situation of shift lever "over shoot" can be avoided when the lock-out gate is at its deployed state, as discussed below.

In a third scenario of operation, the driver has placed the shift lever into the drive gear notch and then subsequently wishes to change the gear in order to suit a driving situation. The driver merely moves the shift lever into the momentary shift lever position to select the gear. For example, for each time the shift lever is moved thereto, the gear select display can serially cycle, as follows. Initially, the gear select display is "P", "R", "N", "D", "Snow", where "Snow" is merely exemplary, and signifies selectability of a gear appropriate for snow conditions if the shift lever passes into the momentary shift lever position. At first pass, the gear select display changes to "P", "R", "N", "Snow", "4WD", whereupon when the shift lever returns to the drive gear notch, the transmission will be in the gear appropriate for snow conditions, and the shift lever will be juxtaposed "Snow", where the gearing appropriate for four wheel drive is the next gear for being selected in this exemplary gear selection cycle. At second pass, the gear select display changes to "P", "R", "N", "4WD" "Sport", whereupon when the shift lever returns to the drive gear notch, the transmission will be in the gear appropriate for four wheel drive operation, and the shift lever will be juxtaposed "4WD", where the gearing appropriate for sport diving is the next gear for being selected in this exemplary gear selection cycle. At third pass, the gear select display changes to "P", "R", "N", "Sport" "L", whereupon when the shift lever returns to the drive gear notch, the transmission will be in the gear appropriate for sport driving, and the shift lever will be juxtaposed "Sport", where Low gear is the next gear for being selected in this exemplary gear selection cycle. At fourth pass, the gear select display changes to "P", "R", "N", "L" "D", whereupon when the shift lever returns to the drive notch, the transmission will be in low gear, and the shift lever will be juxtaposed "L", where drive gear is the next gear for being selected in this exemplary gear selection cycle. At fifth pass, the gear select display changes to "P", "R", "N", "D" "Snow", whereupon when the shift lever returns to the low gear notch, the transmission will be in gear "D", and the shift lever will be juxtaposed "D", where the gearing appropriate for snow driving is the next gear for being selected in this exemplary gear selection cycle. For subsequent passes into the momentary shift lever position, the gear selection sequence then repeats.

In a fourth scenario of operation, the driver has placed the shift lever into the drive gear notch and then turned off the engine, whereupon the electronics of the transmission in response to its programming has shifted the transmission to gear "P". When the driver returns to the vehicle and restarts the engine, the driver will notice the shift lever is at the drive gear notch, but the gear select display will be: "blank", "R", "N", "P", "D" (with the shift lever being juxtaposed "P"). This provides visual information to the driver that the transmission has autonomously shifted to gear "P" and that in order to resume gear "D", the driver must momentarily travel the shift lever to the momentary shift lever position (with service brake). Once the driver has done this, the gear select display becomes again: "P", "R", "N", "D", "S", where "S" is merely exemplary, as it could also be "L" or another gear indicia. Alternatively, the driver could manually shift any gear, such as gear "P" and then the gear select display would again become: "P", "R", "N", "D", "S".

In a fifth scenario of operation, the driver has placed the shift lever into the drive gear notch and the electronics system of the transmission, via sensors and programming detects a road condition of the vehicle, as for example traveling downhill in which the gear indicia of the momentary shift lever position correspondingly changes to "L", or detects snowy conditions in which the gear indicia of the momentary shift lever position correspondingly changes to "Snow". Other conditions of the vehicle can be sensed and correspondingly displayed. In such an autonomous display event, the driver merely moves the shift lever into the momentary shift lever position to select the indicated gear. In the first example above, initially, the gear select display is "P", "R", "N", "D", "S", (where during when the shift lever is passed into the momentary shift lever position, sport gearing will be selected) but upon autonomous detection of a descent, the gear select display changes to "P", "R", "N", "D", "L", whereupon when the shift lever is passed into the momentary shift lever position, the gear select display changes to "R", "N", "L", "D", and when the shift lever returns to the drive gear notch, the transmission will be in low gear with the shift lever juxtaposed "L". The driver can return to drive gear by again passing the shift lever through the momentary shift lever position. In the second example above, initially, the gear select display is "P", "R", "N", "D", "S", (where during when the shift lever is passed into the momentary shift lever position, sport gearing will be selected) but upon autonomous detection of snow conditions, the gear select display changes to "P", "R", "N", "D", "Snow", whereupon when the shift lever is passed into the momentary shift lever position, the gear select display changes to "R", "N", "Snow", "D", and when the shift lever returns to the drive gear notch, the transmission will be in gearing appropriate for snow conditions with the shift lever juxtaposed "Snow". The driver can return to drive gear by again passing the shift lever through the momentary shift lever position.

Further according to the electronic shifter with adaptive position in accordance with the present invention, a lock-out gate may be provided to prevent the driver from placing the shift lever to the momentary gear shift position under certain circumstances. For example, when the driver shifts from gear "P", to gear "D", only gear "D" (that is, the drive gear notch) is permitted by the lockout gate, access to the momentary shift lever position is prevented. However, once the transmission has engaged gear "D" or once the shift lever has remained in the gear drive notch for at least a minimum elapsed period of time (e.g., at least one second), then the gate is opened and the shift lever may pass into the momentary shift lever position.

Accordingly, it is an object of the present invention to provide a latching shifter mated with a shift-by-wire transmission in which the gear cam does not have a low gear notch, instead having is a momentary shift lever position which is spring biased toward the drive gear notch whereby, preferably in combination with a responsively changing gear select display, any driver confusion in the event of autonomous shifting by the transmission is avoided.

This and additional objects, features and advantages of the present invention will become clearer from the following specification of a preferred embodiment.

BRIEF DESCRIPTION OF THE DRAWINGS

FIG. 1 is a schematic, perspective view of a prior art latching shifter.

FIG. 2 is a partly sectional view seen along line 2-2 of FIG. 1.

FIG. 3 is a partly sectional view seen along line 3-3 of FIG. 2, also schematically including a mechanical transmission linked to the latching shifter.

DESCRIPTION OF THE PREFERRED EMBODIMENT

Figure 4:
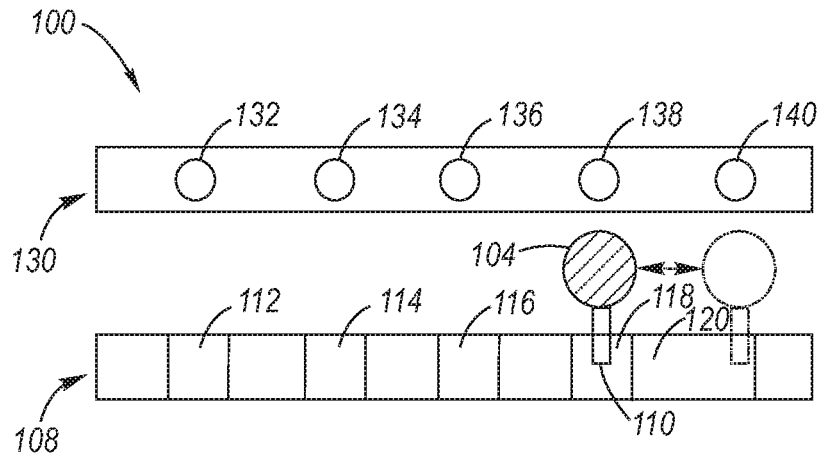
FIG. 4 is a schematic, partly sectional plan view of the shift lever of a latching shifter juxtaposed a gear select display.

Referring now to the Drawing, FIGS. 4 through 35 depict various aspects of a motor vehicle electronic shifter with adaptive position interfaced with a shift-by-wire transmission.

Referring firstly to FIGS. 4 through 7, the electronic shifter with adaptive position 100 according to the present invention implements electronic shifting via a shift lever 104 (as for example generally similar with shift lever 12 of FIG. 1) interfaced with an electronic transmission 106 (see FIG. 7), wherein the latching functionality of the shift lever 104 is provided by a gear cam 108 having a plurality of gear notches into which a cam follower 110 is respectively biased via a spring 112 disposed within the shift lever.

Figure 5:
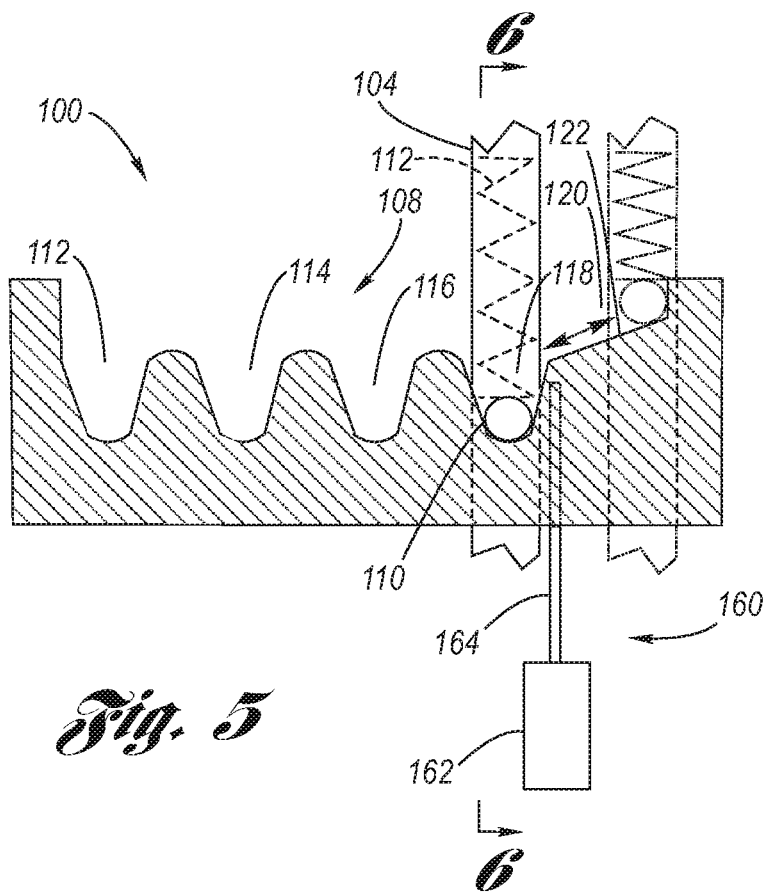
FIG. 5 is a partly sectional side view of a latching shifter and gear cam according to the present invention, wherein the lock-out gate is shown at its retracted state.

As shown by FIGS. 4 and 5, the linear sequence of gear selection provided by the gear cam 108 is: a park gear notch 112 corresponding to driver selection of transmission gear "P" (park gear) 172; a reverse gear notch 114 corresponding to driver selection of transmission gear "R" (reverse gear) 174; a neutral gear notch 116 corresponding to driver selection of transmission gear "N" (neutral gear) 176; and a drive gear notch 118 corresponding to driver selection of transmission gear "D" (drive gear) 178. In addition, the linear sequence continues and ends with a momentary shift lever position 120 corresponding to driver selection of a transmission gear "S" 180, where "S" corresponds to sport gear, but which may be another predetermined gear, or selection of a gear of a range of gears of the transmission, such as for example, low gear, four wheel drive, second gear, first gear, gear appropriate for snow, etc. The momentary shift lever position 120 is defined by an inclined surface 122 which has its lowest point (in relation to the spring biasing direction of the cam follower 110) at the drive gear notch 118. As such, when a driver passes the shift lever 104 into the momentary shift lever position 120, the cam follower 110 is caused to compress the spring 112, whereby if the shift lever is released by the driver, the spring biasing of the cam follower causes the shift lever to springably move into the drive gear notch.

FIG. 4 depicts an example of a preferred structural configuration, in which a gear select display 130 is disposed adjacent the shift lever 104 and is positioned so as to have gear indicia juxtaposed the gear notches of the gear cam 108, in a one-to-one relationship. In this regard, a gear indicia "P" 132 is disposed juxtaposed the park gear notch 112, a gear indicia "R" 134 is disposed juxtaposed the reverse gear notch 114, a gear indicia "N" 136 is disposed juxtaposed the neutral gear notch 116, a gear indicia "D" 138 is disposed juxtaposed the drive gear notch 118, and a gear indicia "S" 148 is disposed juxtaposed the momentary shift lever position 120, wherein, as mentioned, "S" merely is exemplar in that the gear indicia could be "L" or another selected gear indicia. The gear indicia are preferably illuminated indicators which may be selectively changed in dynamic fashion in response to driver selected events of the transmission and to autonomous events of the transmission. For example, in the second scenario of operation discussed below, the gear indicia "D" 138 may be changed to gear indicia "P" at the same time gear indicia "P" 132 is changed to "blank", wherein "blank" means no display of indicia. These indicia changes can be, for example, effected by the electronic control module 106' of the electronic transmission 106.

Figure 6:
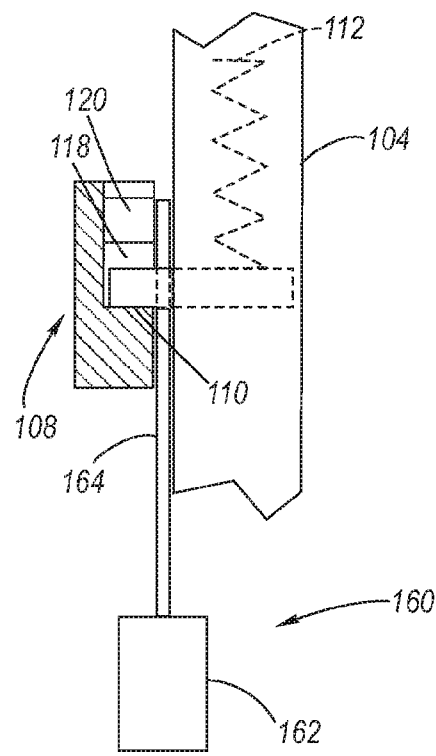
FIG. 6 is a partly sectional end view of the latching shifter and gear cam of FIG. 5, now showing the lock-out gate at its deployed state.

As best shown at FIGS. 5 and 6, the electronic shifter with adaptive position 100 optionally includes a lock-out gate 160 which selectively prevents a driver from accessing the momentary shift lever position 120 by the shift lever of the electronic shifter. By way of a structural example of the lock-out gate 160, an actuator 162 selectively raises and lowers a lock-out bar 164. In the retracted state of the actuator 162, as shown at FIGS. 5 and 6, the shift lever 104 may be freely moved by the driver so as to pass into the momentary shift lever position 120. However, when the actuator 162 is at the deployed stated, as shown at FIG. 7, then the lock-out bar 164 interferes with movement of the cam follower 110 of the shift lever such that the driver cannot move the shift lever into the momentary shift lever position 120.

Figure 7:
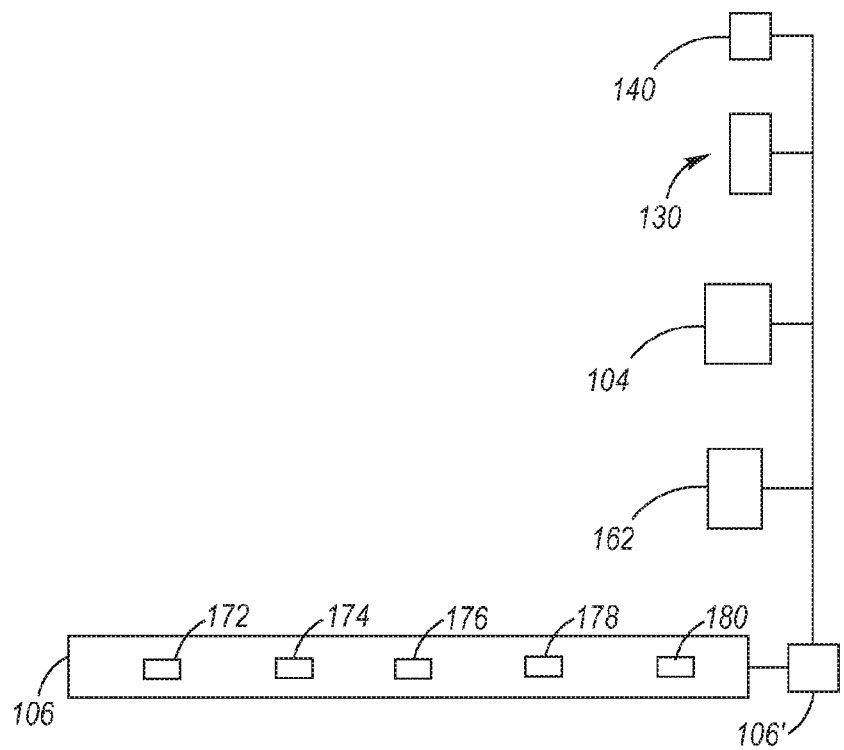
FIG. 7 is a schematic representation of a shift-by-wire transmission interfaced with an electronic latching shifter with adaptive position in accordance with the present invention.

By way merely of an example of implementation, FIG. 7 schematically depicts a shift-by-wire transmission 106 having an electronic controller 106'. The electronic controller 106' is preprogrammed, and is electrically interfaced with the shift lever 104 (to receive drive gear shift commands), with the actuator 162 (to effect selective lock-out of the shift lever with respect to the momentary shift lever position) and with the gear select display 130 (to dynamically change its indicia responsive to gear status). The electronic controller 106' is interfaced with sensors 140 which allow detection of vehicular conditions, which data is used by the electronic controller, responsive to its programming, to provide autonomous actions as described herein in accordance with the present invention.

There are at least five scenarios of operation of the electronic shifter with adaptive position 100, as depicted at FIGS. 8 through 35.

Table II particularizes the numbering convention vis-a-vis the gear select display 130 of FIGS. 8 through 35.

TABLE II

| Numeral | Display | Description |
|---------|---------|-------------|
| 132 | P | Park Gear Indicia |
| 134 | R | Reverse Gear Indicia |
| 136 | N | Neutral Gear Indicia |
| 138 | D | Drive Gear Indicia |
| 142 | Blank | No Display of Indicia |
| 144 | Snow or snowflake graphic | Snow Gear Indicia |
| 146 | 4WD | Four Wheel Drive Gear Indicia |
| 148 | S | Sport or Off-Road Gear Indicia |
| 150 | L | Low Gear indicia |

Figure 8:
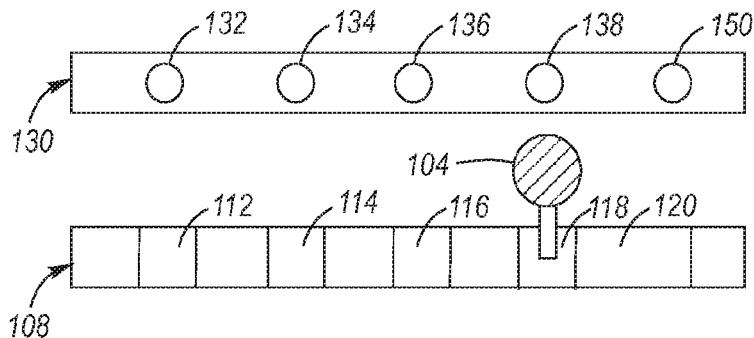
FIGS. 8 through 11 are partly sectional plan views of a shift lever of an electronic shifter and the juxtaposed gear select display in an operational scenario in accordance with the present invention involving a driver selection of gear "D" and a subsequent autonomous shift to another gear by the electronic transmission.
Figure 9:
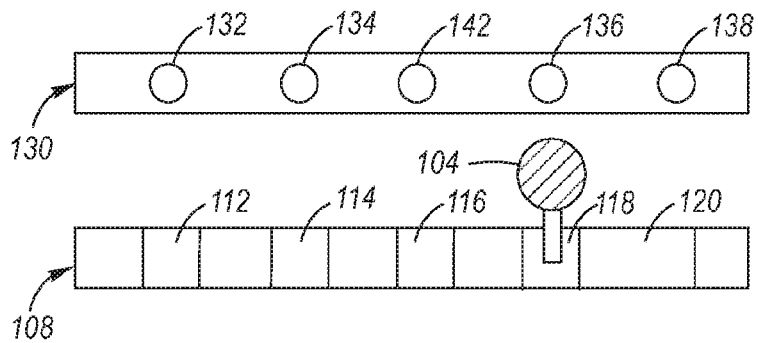
Figure 10:
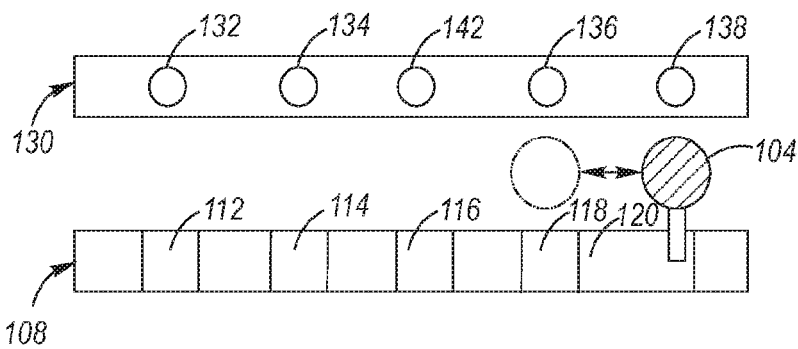
Figure 11:
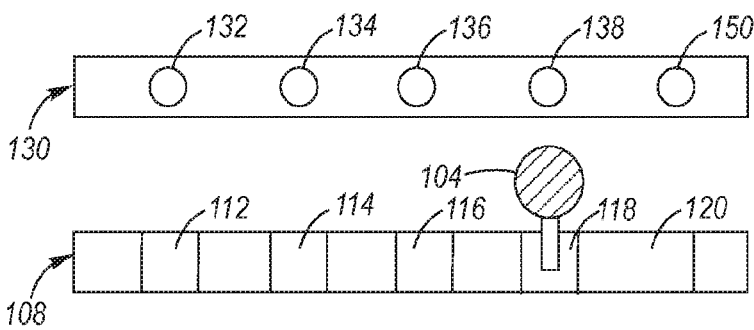

In a first scenario of operation, shown at FIGS. 8 through 11, the driver has placed the shift lever 104 into the drive gear notch 118, as shown at FIG. 8; however, the electronics of the transmission, in response to a pre-programmed shift execution triggered by a motor vehicle event, has placed the transmission autonomously into neutral gear irrespective of the gear shift lever placement. In this situation, the gear select display 130 would change from the sequence: "P", "R", "N", "D", "L" (wherein "L" could be "S" or another gear indicia), with the shift lever 104 being juxtaposed "D") as shown at FIG. 8, to "P", "R", "blank", "N", "D" (with the shift lever now being juxtaposed "N", where "blank" signifies no display of indicia, as shown at FIG. 9. This provides visual information to the driver that the transmission has autonomously shifted to gear "N" and that in order to resume gear "D", the driver must momentarily travel the shift lever to the momentary shift lever position 120, as shown at FIG. 10. Once the driver has done this, and the shift lever 104 returns to the drive gear notch 118, then the gear select display becomes again: "P", "R", "N", "D", "L", as shown at FIG. 11. Alternatively, the driver could manually shift any gear, such as gear "P" and then the gear select display would again become: "P", "R", "N", "D", "L".

Figure 12:
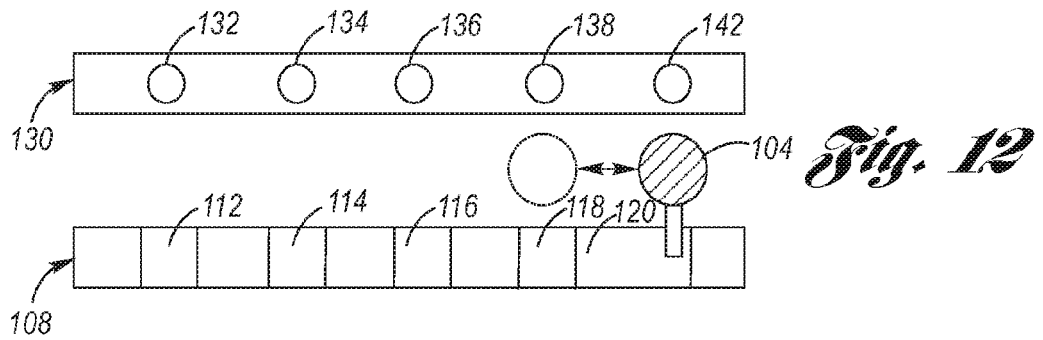
FIGS. 12 and 13 are a partly sectional plan view of a shift lever of an electronic shifter and the juxtaposed gear select display in an operational scenario in accordance with the present invention involving a driver overshoot to the momentary shift lever position.
Figure 13:
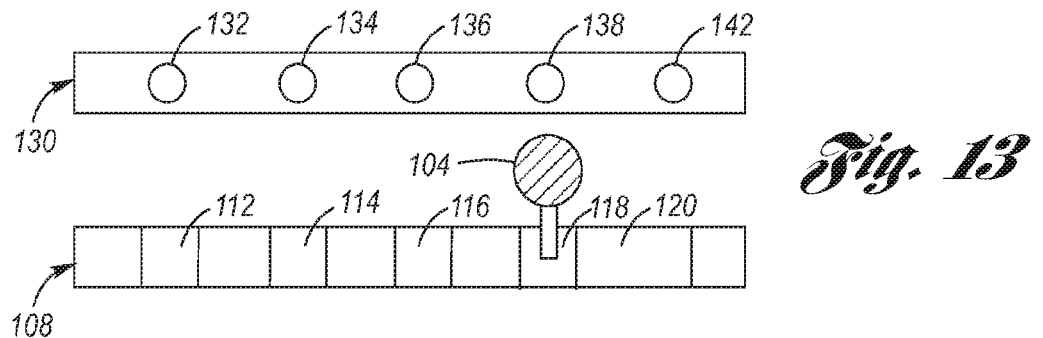

In a second scenario of operation, shown at FIGS. 12 and 13, the driver has the intention to place the shift lever into the drive gear notch, but instead has accidentally placed the shift lever 104 to the momentary shift lever position 120, as shown at FIG. 12. The gear select display is: "P", "R", "N", "D", "Blank", where, in this example, the gear indicia of the momentary shift lever position has no indicia displayed. When the spring biasing places the shift lever in the drive gear notch 118, as shown at FIG. 13, the transmission will be in gear "D". This situation of shift lever "over shoot" can be avoided when the lock-out gate 160 is at its deployed state, as shown at FIG. 6.

Figure 14:
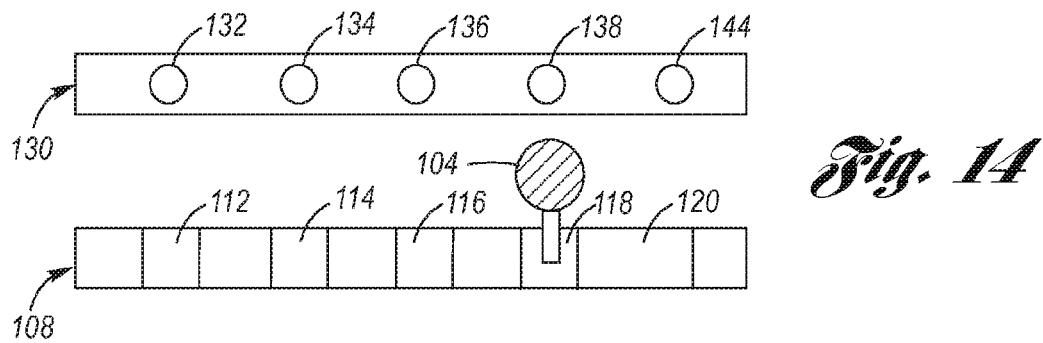
FIGS. 14 through 24 are partly sectional plan views of a shift lever of an electronic shifter and the juxtaposed gear select display in an operational scenario in accordance with the present invention involving the driver selecting a gear other than gear "D" via repetitive sequencing through the momentary shift lever position.
Figure 15:
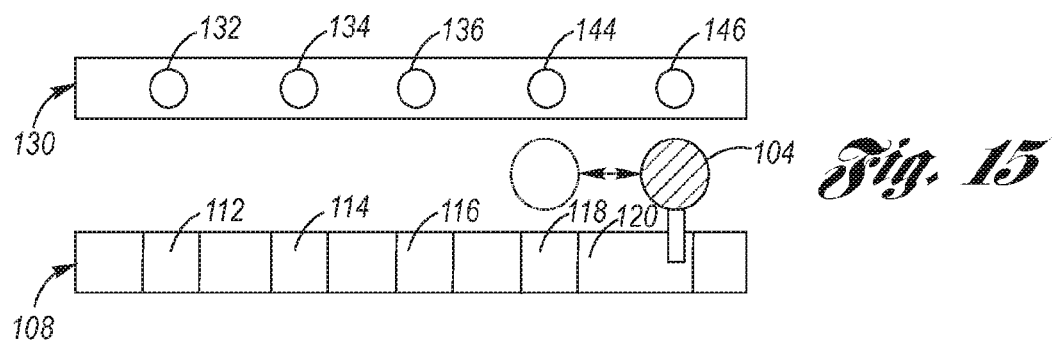
Figure 16:
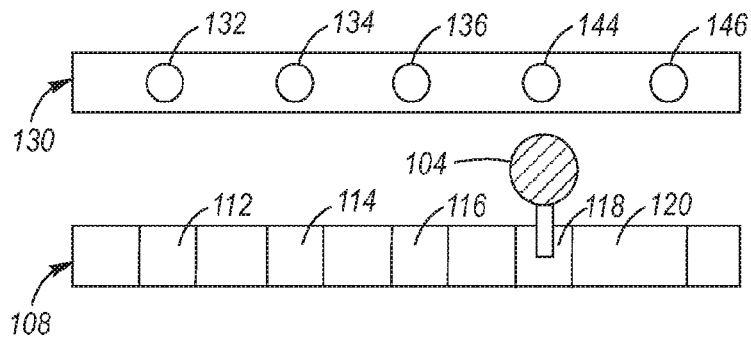
Figure 17:
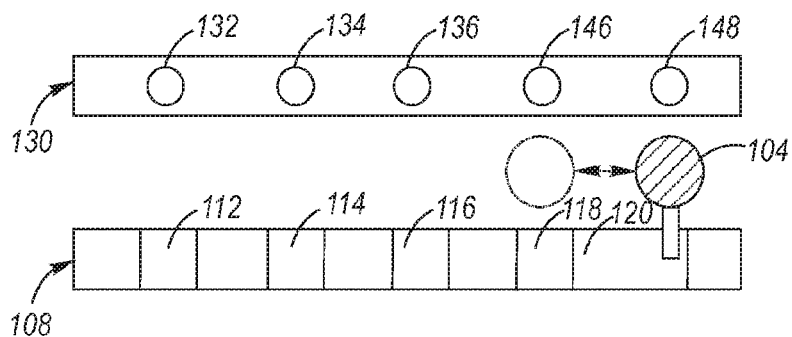
Figure 18:
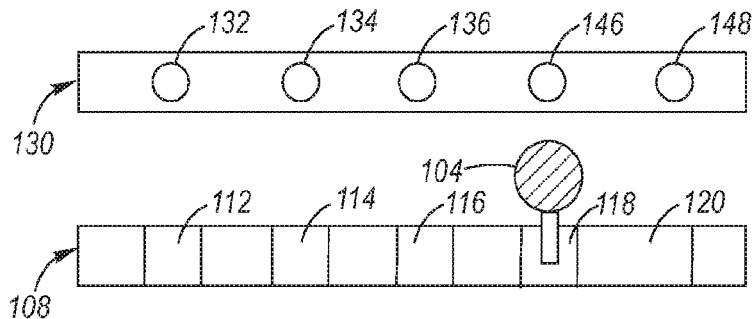
Figure 19:
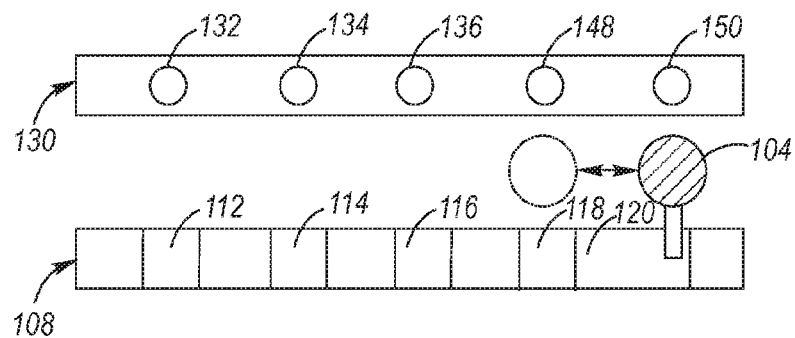
Figure 20:
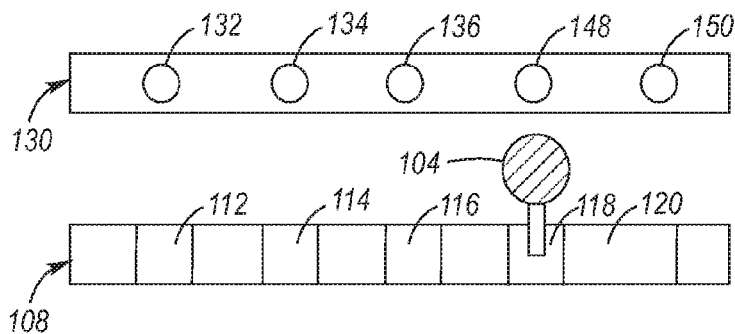
Figure 21:
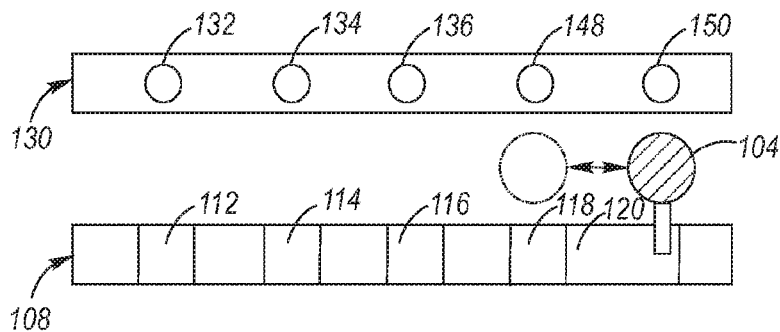
Figure 22:
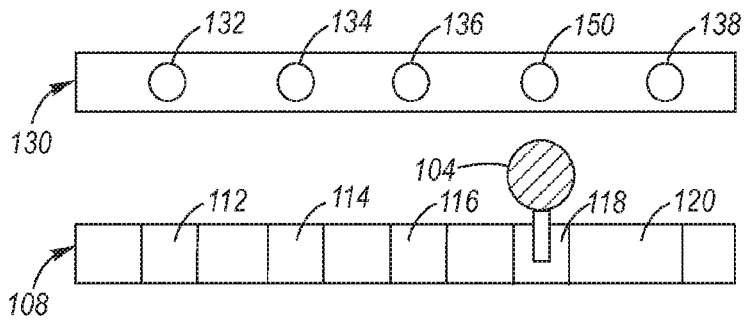
Figure 23:
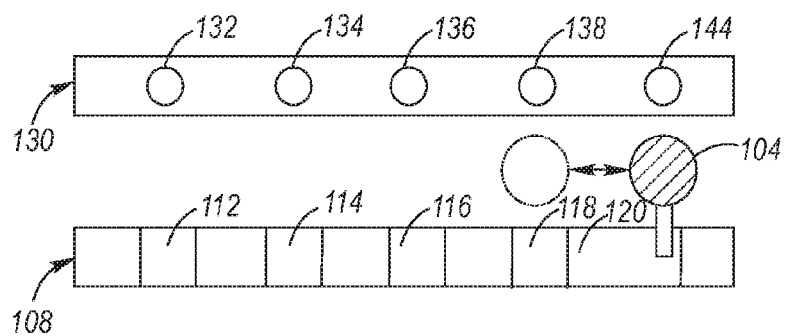
Figure 24:
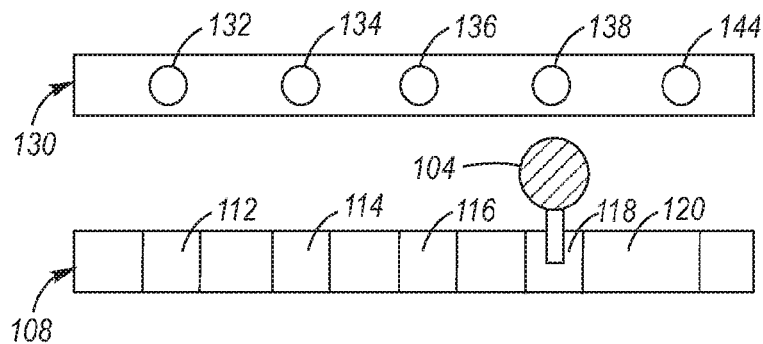

In a third scenario of operation, shown at FIGS. 14 through 24, the driver has placed the shift lever 104 into the drive gear notch 118 and then subsequently wishes to change the gear in order to suit a driving situation. The driver merely moves the shift lever into the momentary shift lever position 120 to select the gear. For example, for each time the shift lever is moved thereto, the gear select display can serially cycle, as follows. Initially, as shown at FIG. 14, the gear select display 130 is "P", "R", "N", "D", "Snow", where "Snow" is merely exemplary, and signifies selectability of a gear appropriate for snow conditions if the shift lever passes into the momentary shift lever position. At first pass into the momentary shift lever position 120, as shown at FIG. 15, the gear select display 130 changes to "P", "R", "N", "Snow", "4WD", whereupon when the shift lever returns to the drive gear notch 118, as shown at FIG. 16, the transmission will be in the gear appropriate for snow conditions, and the shift lever 104 will be juxtaposed "Snow", where the gearing appropriate for four wheel drive is the next gear for being selected in this exemplary gear selection cycle. At second pass into the momentary shift lever position 120, as shown at FIG. 17, the gear select display 130 changes to "P", "R", "N", "4WD" "Sport", whereupon when the shift lever returns to the drive gear notch 118, as shown at FIG. 18, the transmission will be in the gear appropriate for four wheel drive operation, and the shift lever 104 will be juxtaposed "4WD", where the gearing appropriate for sport diving is the next gear for being selected in this exemplary gear selection cycle. At third pass, as shown at FIG. 19, the gear select display 130 changes to "P", "R", "N", "Sport", "L", whereupon when the shift lever 104 returns to the drive gear notch 118, as shown at FIG. 20, the transmission will be in the gear appropriate for sport driving, and the shift lever will be juxtaposed "Sport", where low gear is the next gear for being selected in this exemplary gear selection cycle. At fourth pass into the momentary shift lever position 120, as shown at FIG. 21, the gear select display 130 changes to "P", "R", "N", "L" "D", whereupon when the shift lever 104 returns to the drive notch 118, the transmission will be in low gear, and the shift lever will be juxtaposed "L", as shown at FIG. 22, where drive gear is the next gear for being selected in this exemplary gear selection cycle. At fifth pass into the momentary shift lever position 120, as shown at FIG. 23, the gear select display 130 changes to "P", "R", "N", "D" "Snow", whereupon when the shift lever 104 returns to the low gear notch, the transmission will be in gear "D", as shown at FIG. 24, and the shift lever will be juxtaposed "D", where the gearing appropriate for snow driving is the next gear for being selected in this exemplary gear selection cycle. For subsequent passes into the momentary shift lever position, the gear selection sequence then repeats.

Figure 25:
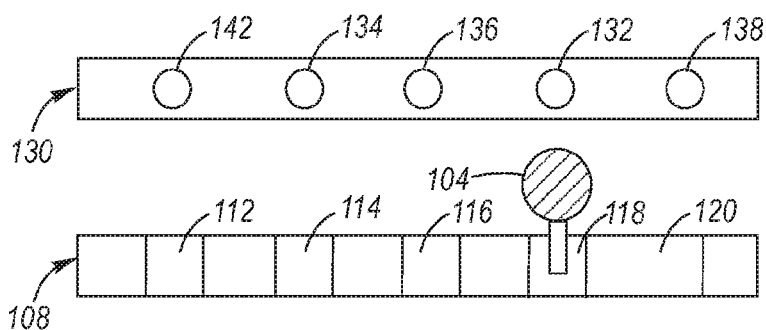
FIGS. 25 through 27 are partly sectional plan views of a shift lever of an electronic shifter and the juxtaposed gear select display in an operational scenario in accordance with the present invention involving the driver leaving the shift lever in the drive gear notch when turning off the engine whereupon the electronics of the transmission has autonomous shifted the transmission to gear "P".
Figure 26:
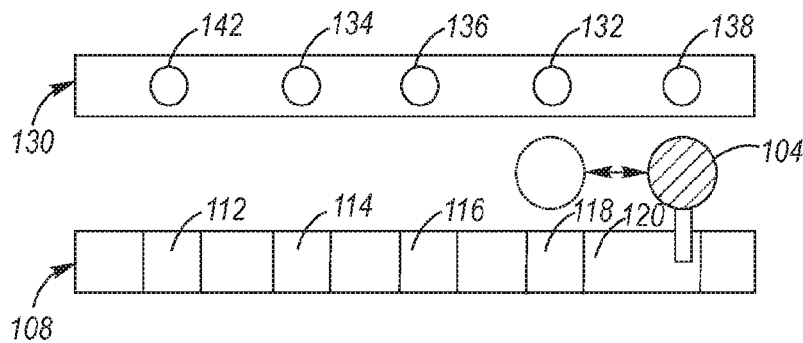
Figure 27:
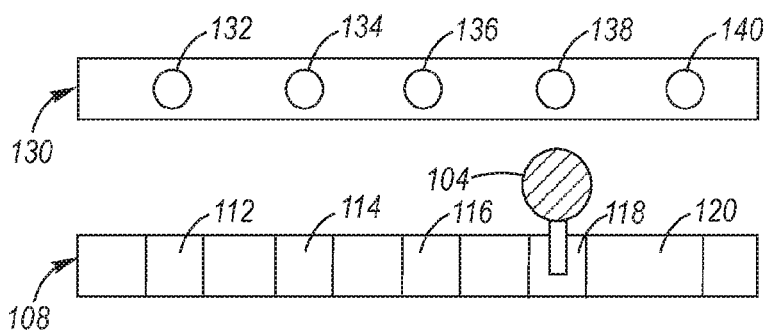

In a fourth scenario of operation, shown at FIGS. 25 through 27, the driver has placed the shift lever 104 into the drive gear notch 118, and then subsequently turned off the engine, whereupon the electronics of the transmission in response to its programming has shifted the transmission to gear "P". When the driver returns to the vehicle and restarts the engine, the driver will notice, as shown at FIG. 25, the shift lever 104 is at the drive gear notch 118, but the gear select display will be: "blank", "R", "N", "P", "D" (with the shift lever being juxtaposed "P"). This provides visual information to the driver that the transmission has autonomously shifted to gear "P" and that in order to resume gear "D", the driver must momentarily travel the shift lever to the momentary shift lever position 120 (with service brake), as shown at FIG. 26. Once the driver has done this, as shown at FIG. 27, the gear select display becomes again: "P", "R", "N", "D", "S", where "S" is merely exemplary, as it could be "L" or another gear indicia. Alternatively, the driver could manually shift any gear, such as gear "P" and then the gear select display would again become: "P", "R", "N", "D", "L".

In a fifth scenario of operation, as shown at FIGS. 28 through 35, the driver has placed the shift lever 104 into the drive gear notch 118 and the electronics system of the transmission, via sensors and programming detects a road condition of the vehicle, as for example traveling downhill in which the gear indicia of the momentary shift lever position correspondingly changes to "L", or detects snowy conditions in which the gear indicia of the momentary shift lever position correspondingly changes to "Snow". Other conditions of the vehicle can be sensed and correspondingly displayed. In such an autonomous display event, the driver merely moves the shift lever 104 into the momentary shift lever position 120 to select the autonomously indicated gear.

Figure 28:
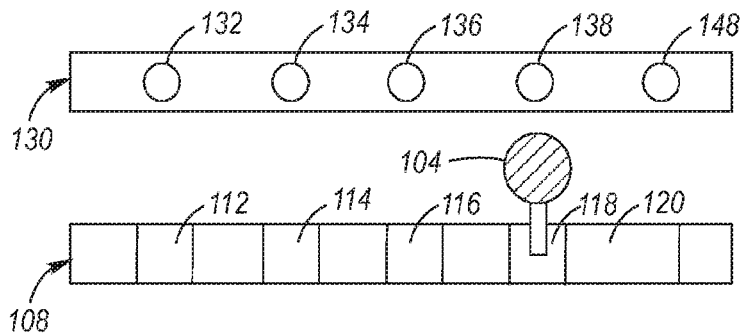
FIGS. 28 through 35 are partly sectional plan views of a shift lever of an electronic shifter and the juxtaposed gear select display in an operational scenario in accordance with the present invention involving an autonomous driving condition detection by the electronics of the transmission and the autonomous indication of a corresponding gear selectable by passing the shift lever through the momentary shift lever position.
Figure 29:
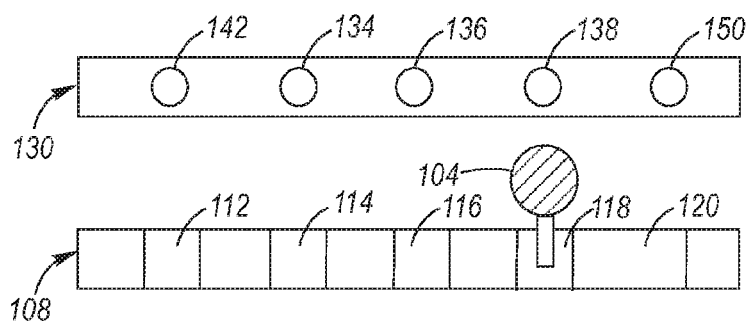
Figure 30:
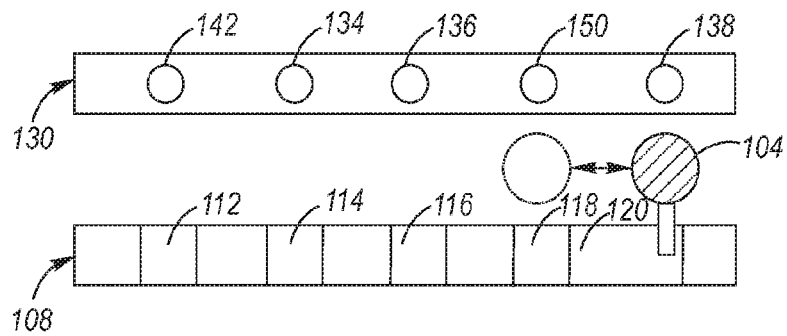
Figure 31:
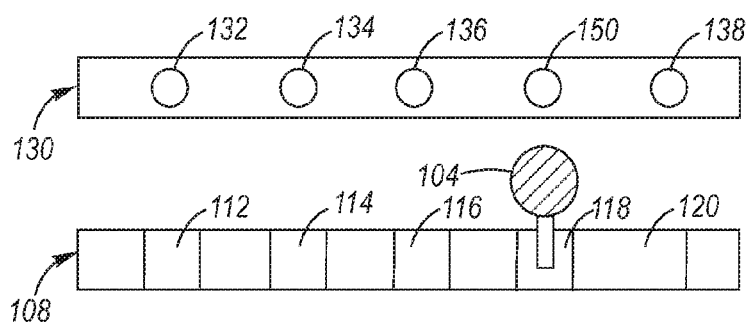

In the first example above with respect to FIGS. 28 through 31, initially, as shown at FIG. 28, the gear select display 130 is "P", "R", "N", "D", "S", (where during when the shift lever is passed into the momentary shift lever position, sport gearing will be selected). However, upon an autonomous detection of a descent of the vehicle, the electronics of the transmission autonomously changes the gear select display 130 to "P", "R", "N", "D", "L", as shown at FIG. 29, whereupon when the shift lever is passed into the momentary shift lever position 120, as shown at FIG. 30, the gear select display changes to "R", "N", "L", "D", and when the shift lever returns to the drive gear notch, as shown at FIG. 31, the transmission will be in low gear with the shift lever juxtaposed "L". The driver can return to drive gear by again passing the shift lever through the momentary shift lever position.

Figure 32:
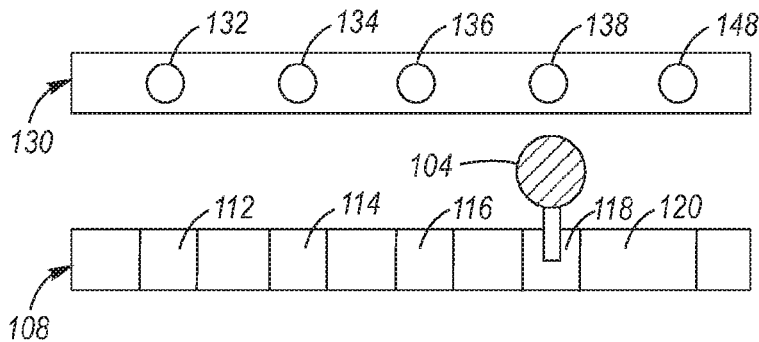
Figure 33:
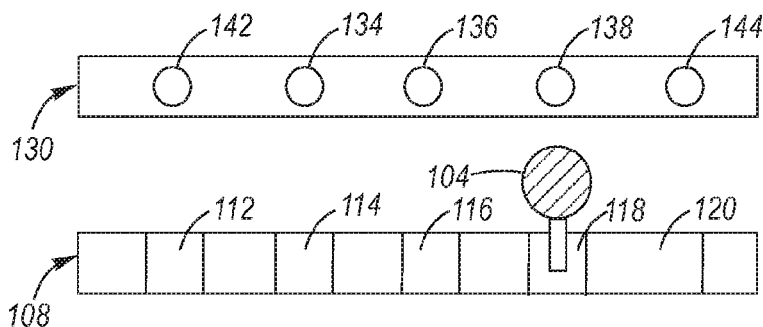
Figure 34:
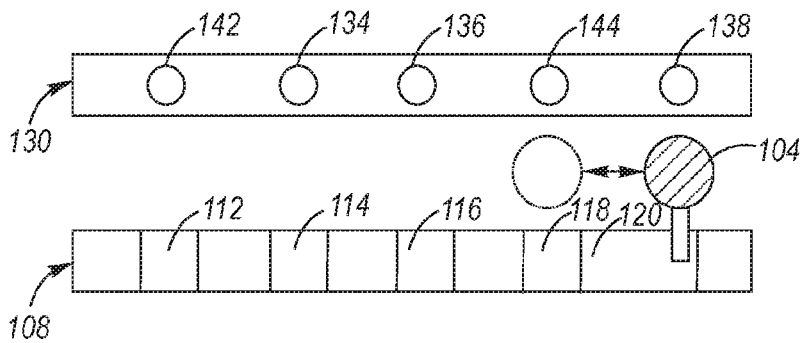
Figure 35:
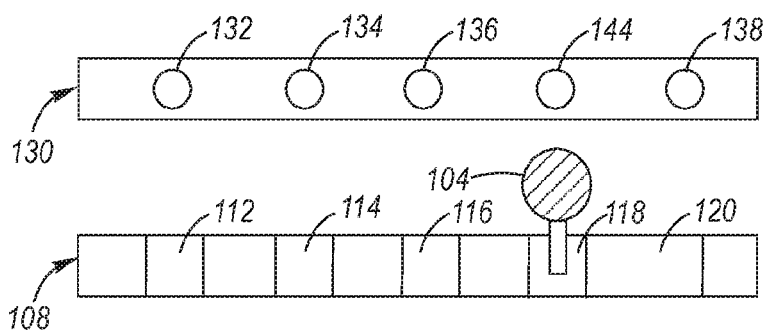

In the second example above with respect to FIGS. 32 through 35, initially, as shown at FIG. 32, the gear select display is "P", "R", "N", "D", "S", (where during when the shift lever is passed into the momentary shift lever position, sport gearing will be selected). However, in response to an autonomous detection of snowy conditions, the electronics of the transmission autonomously changes the gear select display 130 changes to "P", "R", "N", "D", "Snow", as shown at FIG. 33, whereupon when the shift lever 104 is passed into the momentary shift lever position 120, the gear select display 130 changes to "R", "N", "Snow", "D", as shown at FIG. 34, and when the shift lever returns to the drive gear notch, as shown at FIG. 35 the transmission will be in gearing appropriate for snow conditions with the shift lever juxtaposed "Snow". The driver can return to drive gear by again passing the shift lever through the momentary shift lever position.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A latching shifter with adaptive position and a shift-by-wire transmission, comprising:
   a shift-by-wire transmission comprising electronics for shifting gears of said shift-by-wire transmission in response to manual selection by a driver and to autonomous selection by said electronics; and
   a latching shifter connected to said electronics for manual selection of gears of said shift-by-wire transmission, said latching shifter comprising:
   a shift lever;
   a cam follower movably connected to said shift lever;
   a gear cam comprising:
      a plurality of serially arranged gear notches including a drive gear notch; and
      a momentary shift lever position adjoining said drive gear notch;
      wherein said plurality of serially arranged gear notches and said momentary shift lever position are linearly disposed with respect to each other; and
   a biasing spring biasing said cam follower into any gear notch of said plurality of gear notches; wherein said momentary shift lever position is defined by a surface thereof on which said cam follower is slidable, said surface being inclined with respect to biasing by said biasing spring toward said drive gear notch such that after said cam follower is disposed at said momentary shift lever position, said cam follower slides into said drive gear notch.

2. The latching shifter and transmission of claim 1, further comprising a gear select display juxtaposed said plurality of gear notches, wherein said gear select display displays gears of the transmission respectively juxtaposed each said gear notch and said momentary shift lever position.

3. The latching shifter and transmission of claim 2, wherein the displayed gears of the transmission dynamically changes in response to an autonomous gear shift by said electronics of said shift-by-wire transmission to a gear other than a manually selected gear.

4. The latching shifter and transmission of claim 1, wherein said gear notches and said momentary shift lever position define a shifting paradigm of the shift-by-wire transmission sequentially given by a park gear notch, a reverse gear notch, a neutral gear notch, a drive gear notch, and a momentary shift lever position of at least one predetermined gear.

5. The latching shifter and transmission of claim 4, wherein said at least one predetermined gear comprises a range of predetermined gears, each gear of said range of predetermined gears being selectable by sequential passes of said shift lever through said momentary shift lever position.

6. The latching shifter and transmission of claim 4, further comprising a gear select display juxtaposed said plurality of gear notches, wherein said gear select display displays gears of the transmission respectively juxtaposed each said gear notch and said momentary shift lever position.

7. The latching shifter and transmission of claim 6, wherein the displayed gears of the transmission dynamically changes in response to an autonomous gear shift by said electronics of said shift-by-wire transmission to a gear other than a manually selected gear.

8. The latching shifter and transmission of claim 4, further comprising a lock-out gate disposed adjacent said gear cam which selectively prevents said shift lever from passing into said momentary shift lever position.

9. The latching shifter and transmission of claim 8, further comprising a gear select display juxtaposed said plurality of gear notches, wherein said gear select display displays gears of the transmission respectively juxtaposed each said gear notch and said momentary shift lever position.

10. The latching shifter and transmission of claim 9, wherein the displayed gears of the transmission dynamically changes in response to an autonomous gear shift by said electronics of said shift-by-wire transmission to a gear other than a manually selected gear.

* * * * *